United States Patent [19]

Stephens

[11] Patent Number: 5,362,391
[45] Date of Patent: Nov. 8, 1994

[54] APPARATUS FOR PICKING UP OIL FROM WATER

[76] Inventor: Leo W. Stephens, Box 268, Sharon Springs, Kans. 67758

[21] Appl. No.: 894,550

[22] Filed: Jun. 5, 1992

[51] Int. Cl.⁵ ............................................. E02B 15/04
[52] U.S. Cl. .................................. 210/242.3; 210/923
[58] Field of Search ................. 210/242.3, 776, 923, 210/400, 401

[56] References Cited

U.S. PATENT DOCUMENTS

| | | | |
|---|---|---|---|
| 3,314,545 | 4/1967 | Grubbs et al. | 210/242.3 |
| 3,643,804 | 2/1972 | Sharpton | 210/923 |
| 3,700,108 | 10/1972 | Richmonds | 210/923 |
| 3,947,360 | 3/1976 | Fast | 210/923 |
| 3,968,041 | 6/1976 | De Voss | 210/923 |
| 3,980,559 | 9/1976 | Netzell | 210/923 |
| 4,138,340 | 2/1979 | Suzuki et al. | 210/923 |
| 4,834,880 | 5/1989 | Lundin | 210/923 |
| 5,028,325 | 7/1991 | Hamilton | 210/923 |

FOREIGN PATENT DOCUMENTS 8001294 6/1980 WIPO .

Primary Examiner—Stanley S. Silverman
Assistant Examiner—Christopher Upton
Attorney, Agent, or Firm—John W. Carpenter

[57] ABSTRACT

A vessel having an apparatus for picking up oil from water. The apparatus is supported by a deck of the vessel, and includes a support frame adapted to be supported by the deck and functions to extend into a body of water having oil. A plurality of rollers is rotatably secured to the support frame, with one of the rollers functioning for moving an endless metal wire-like conveyor entrained over the rollers. A pick-up frame is secured to an end of the support frame. The pick-up frame has a pair of rollers rotatably supporting the wire-like conveyor. A guide member is supported by a deck of the vessel. A spring biased shaft slidably passes through the guide member. A roller support frame is secured to the end of the spring biased shaft and has a pair of guide rollers rotatably secured thereto for guiding and conveying the wire-like conveyor.

14 Claims, 17 Drawing Sheets

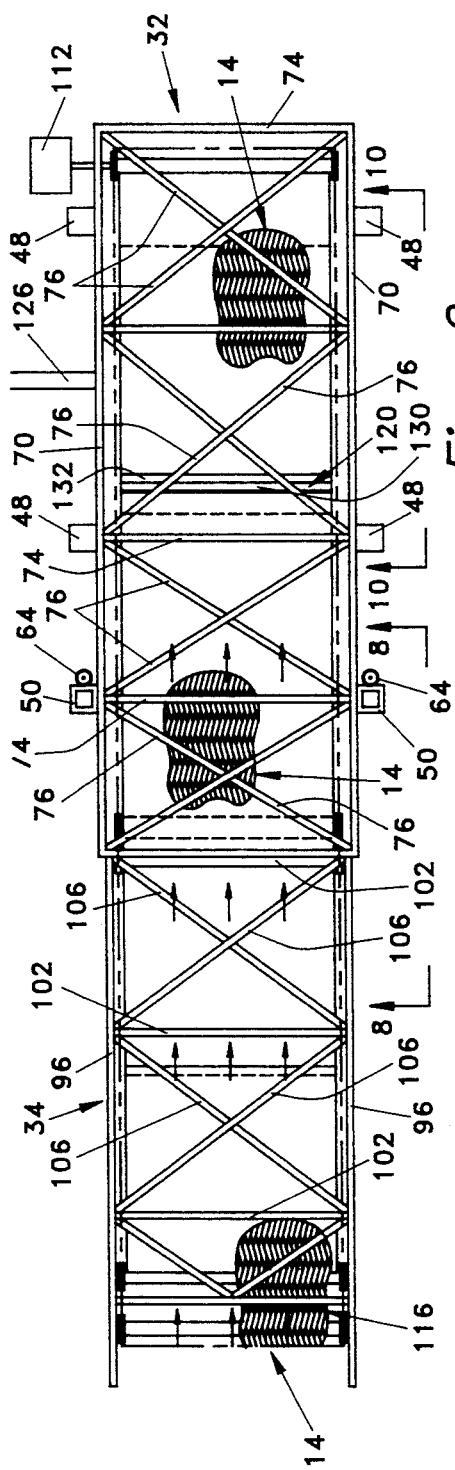
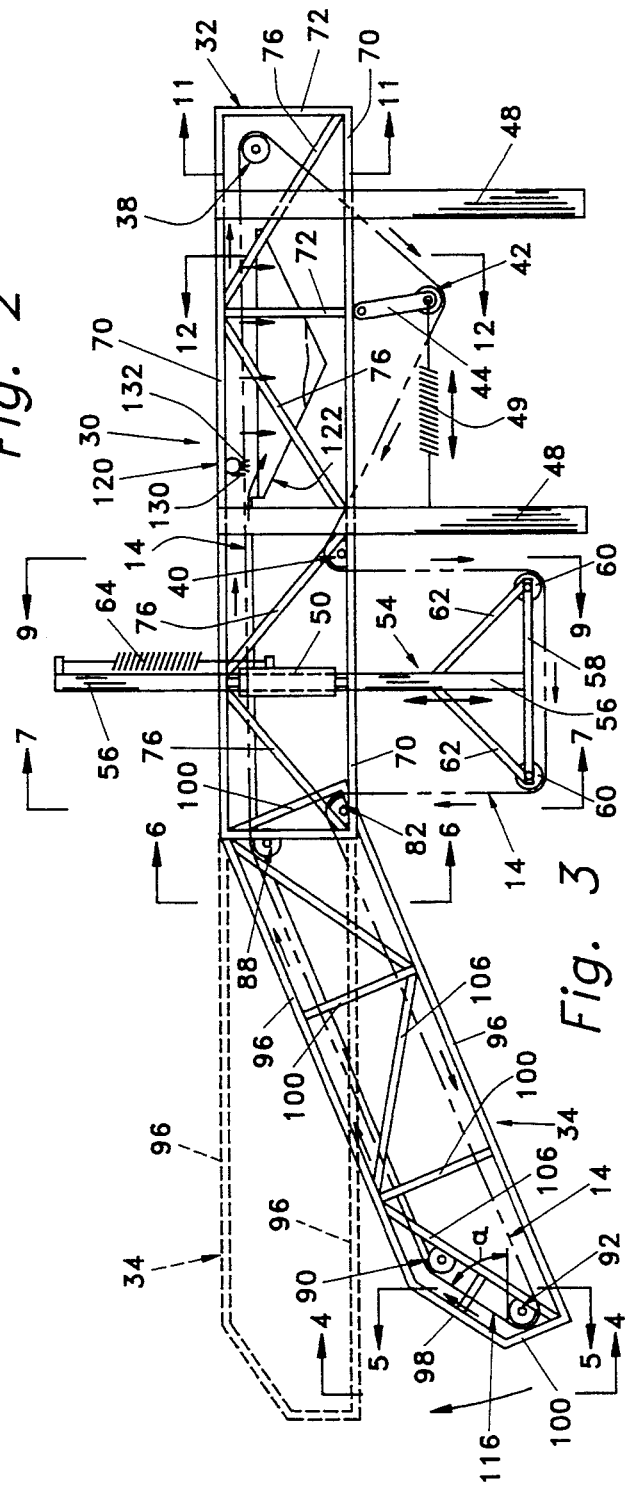

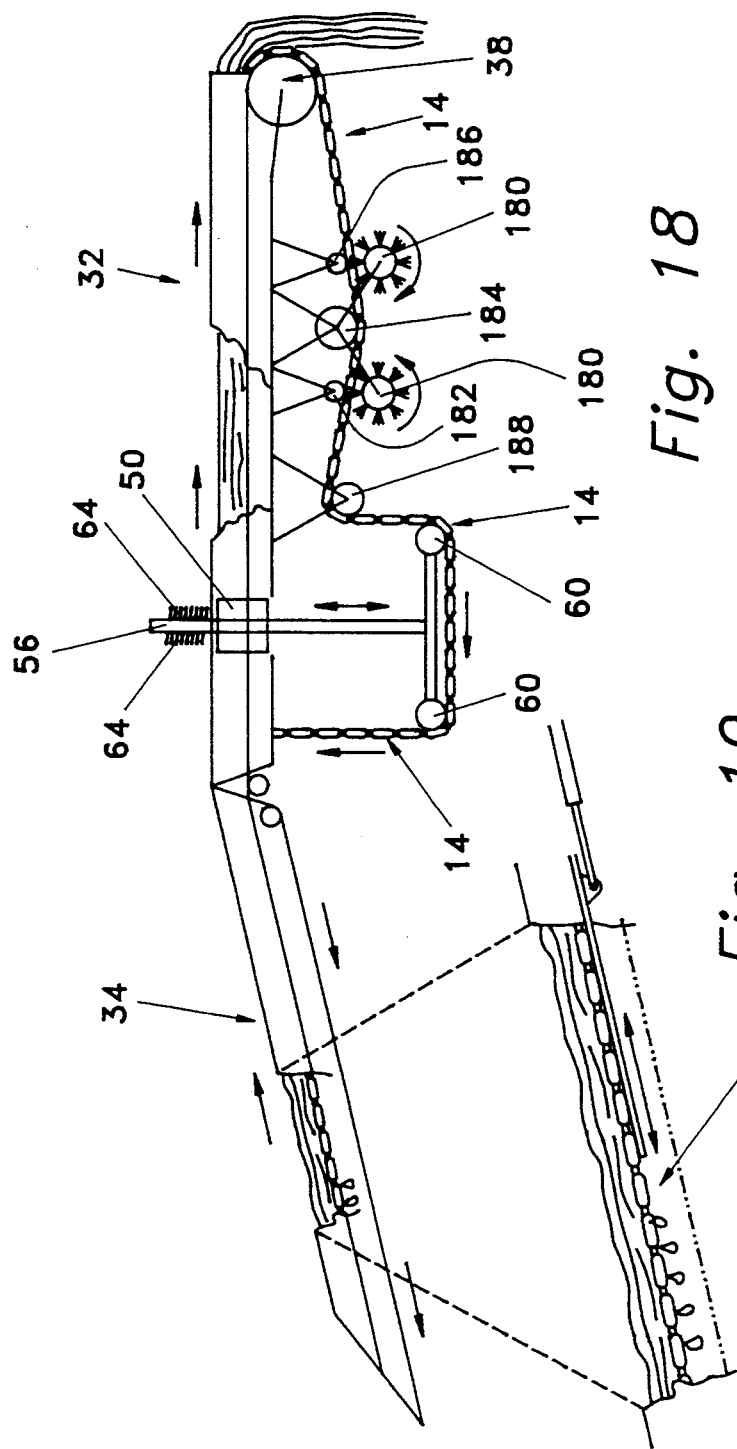
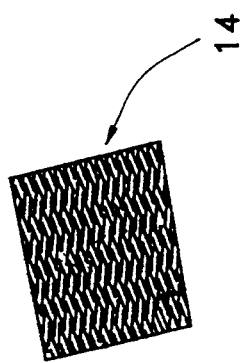
Fig. 18
Fig. 19
Fig. 20

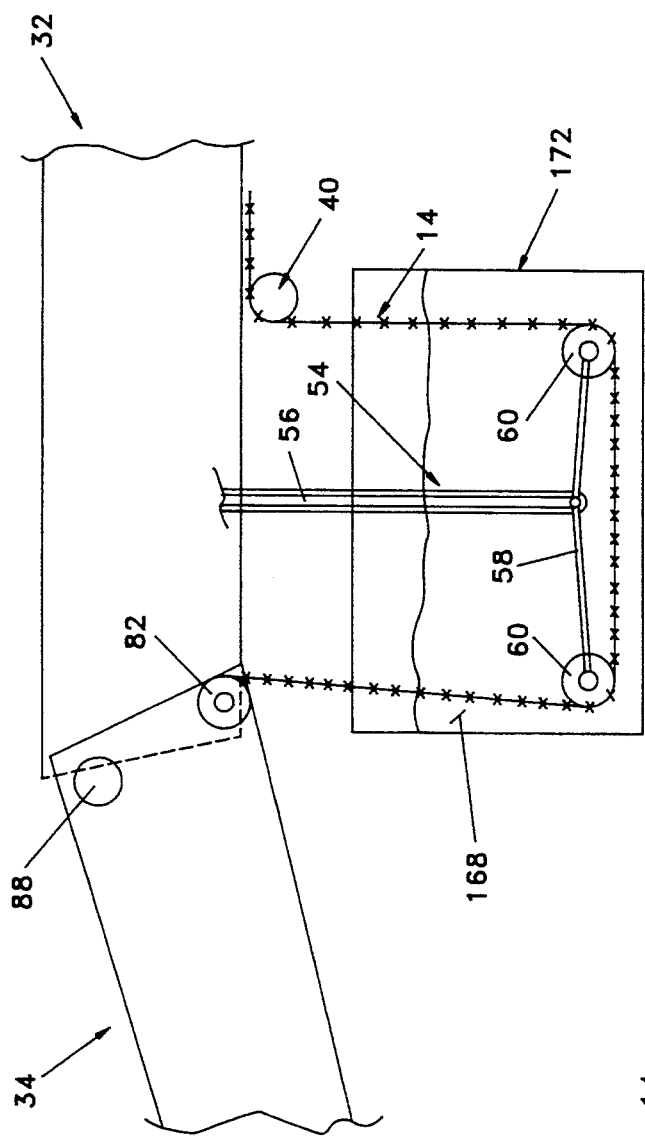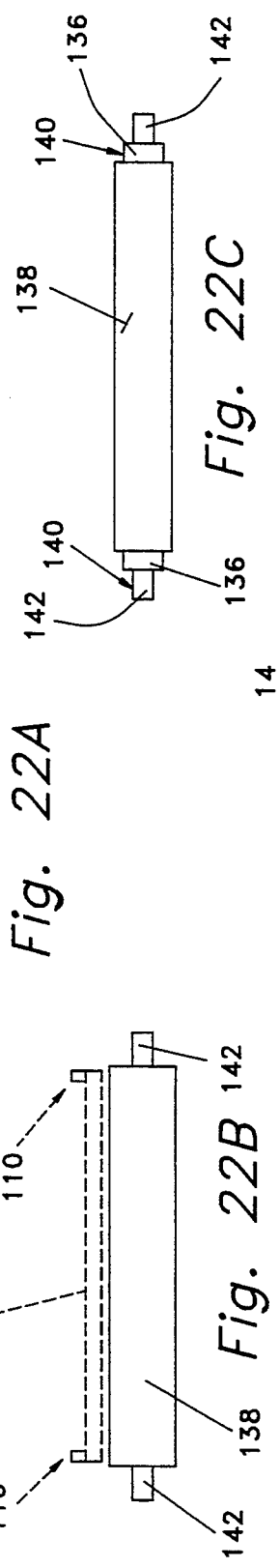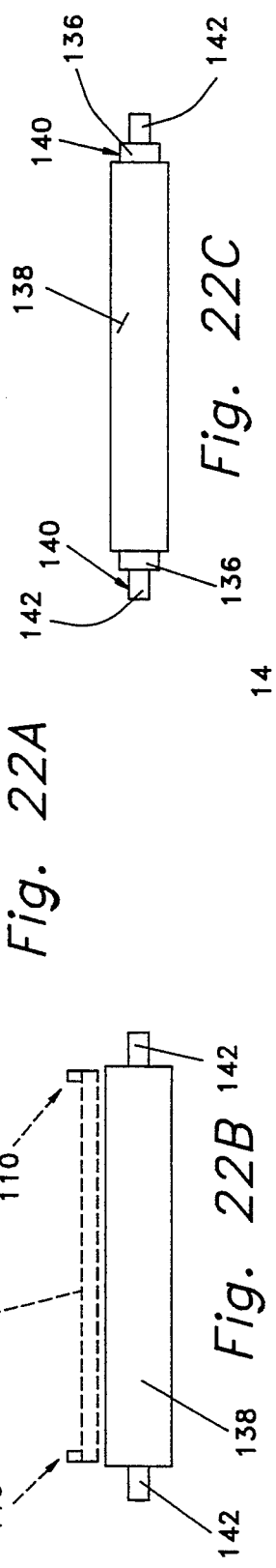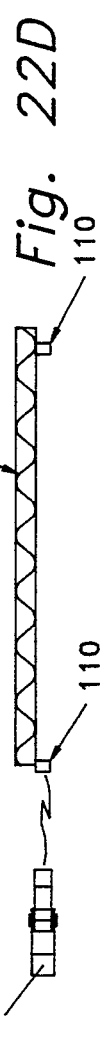

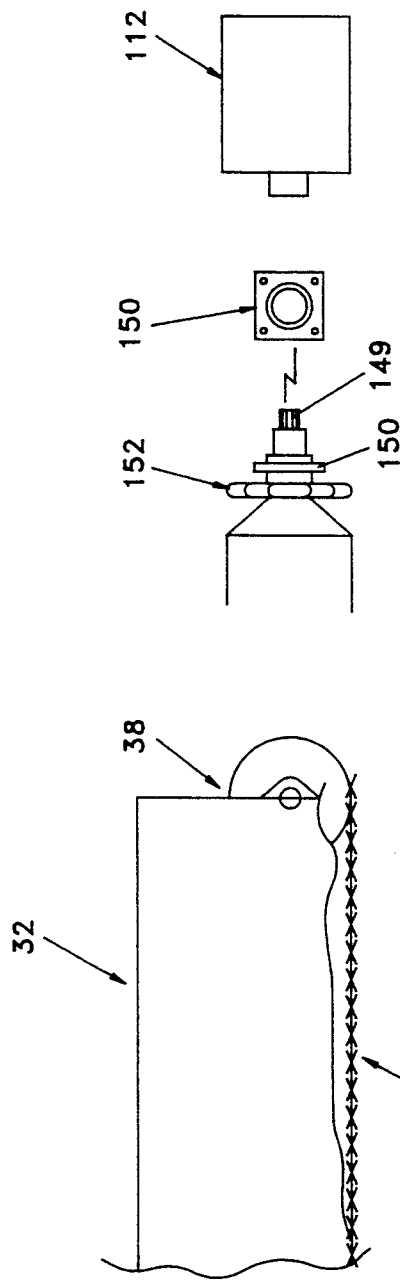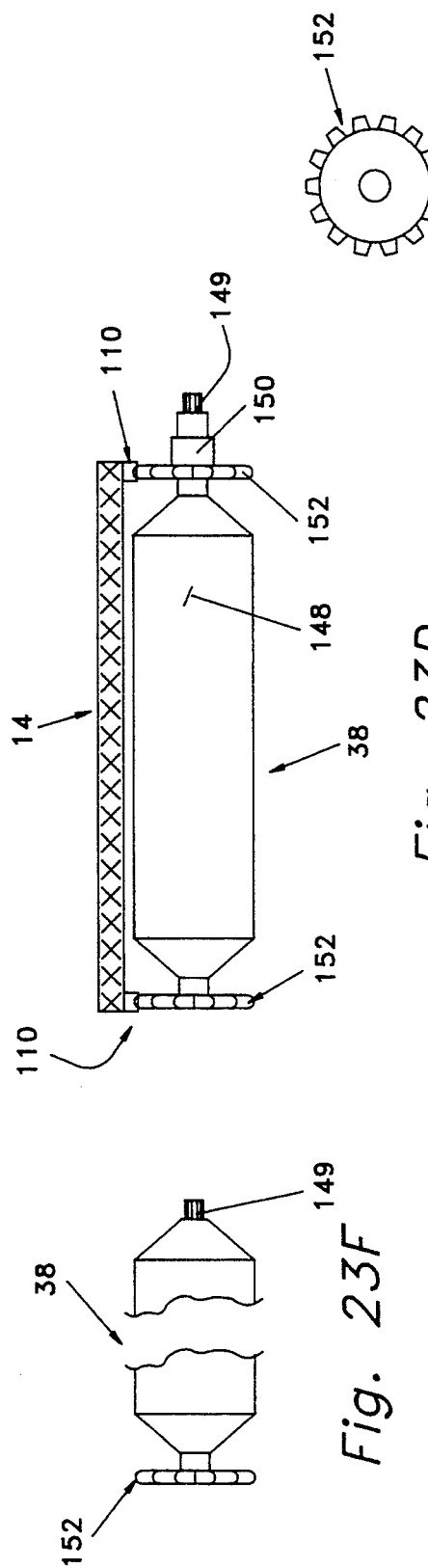

5,362,391

APPARATUS FOR PICKING UP OIL FROM WATER

FIELD OF THE INVENTION

This invention is related to an apparatus for picking up oil from water, more particularly from the surface of the water. More specifically, the present invention provides for a vessel, such as a water craft, having and/or supporting an apparatus or device for picking up oil from water and from the surface of the water.

DESCRIPTION OF THE PRIOR ART

There has been much publicity concerning the pollution, fouling or otherwise contamination of water and beaches, from oil spills, oil tanker shipwrecks, leakage from oil wells, and intentional oil dumping, all resulting in the necessity for clean up of the beaches and the water in order to protect marine life and wildlife. Remedial measures for removing oil from water have not been as successful as desired. Remedial measures as dumping straw in to water to absorb the oil and other contaminants and their raking or gathering the oil-laden straw from the water have been employed, along with rotatable mats extending obliquely into the water for collecting and removing oil which is on the surface of the water. It has been shown that the efficiency of these devices has been questionable, especially when the oil is in deeper water. There is also the problem in deeper water of having to transfer the oil once it is removed from the water, all without an unreasonable expenditure of labor.

A patentability investigation was conducted and the following U.S. Patents by Nos. were discovered:

U.S. Pat. No. 3,685,653—Titled: METHOD FOR THE SEPARATION OF OIL AND WATER FROM AN EMULSION, Van Stavern U.S. Pat. No. 3,907,685—Titled: BELT DEVICE FOR COLLECTING FLOATING MATTER FROM WATER SURFACE, Aramaki U.S. Pat. No. 3,947,360—Titled: ENVIRONMENT PROTECTIVE OIL SKIMMING AND REMOVAL APPARATUS, Fast U.S. Pat. No. 4,105,554—Tilted: OIL SPILL RETRIEVAL SYSTEM, Janson U.S. Pat. No. 4,368,122—Titled: SYSTEM FOR SEPARATING AND COLLECTING OILY MATERIALS FROM WATER EXPANSES, Ravagnan U.S. Pat. No. 4,456,536—Titled: SKIMMER APPARATUS FOR RECOVERING BITUMEN, Lorenz U.S. Pat. No. 4,473,469—Titled: APPARATUS FOR RECOVERING FLUID SUBSTANCES FLOATING ON A WATER SURFACE, Ayroldi U.S. Pat. No. 4,834,880—Titled: DEVICE FOR PICKING UP OIL, Lunden The inventions in the immediate foregoing patents are encumbered with one or more deficiencies. Therefore, what is needed and what has been invented by me is an apparatus for removing oil from water. The apparatus is particularly adapted for being supported by a water craft or other vessel.

SUMMARY OF THE INVENTION

The present invention accomplishes its desired objects by broadly providing an apparatus for picking up oil from water comprising a main frame; and an ancillary frame pivotally secured to the main frame. A drive roller is rotatably supported by the main frame; and a means is engaged to the drive roller, for driving and rotating the drive roller. A spring biased main inside roller is rotatably supported by the main frame along with a main outside roller which is also rotatably supported by the main frame. A biased roller assembly is supported by the main frame and comprises a pair of assembly inside rollers. An ancillary outside roller is rotatably supported by the ancillary frame; and a plurality of ancillary inside rollers is also rotatably supported by the ancillary frame. An endless metal wire-like conveyor is entrained over the drive roller, the biased main inside roller, the main outside roller, the pair of assembly inside rollers, the ancillary outside rollers and the plurality of ancillary inside rollers. The endless metal wire-like conveyor is for picking up oil from water.

The present invention also accomplishes its desired objects by providing an apparatus or device for picking up oil from water and adapted to be installed on a water craft. The apparatus or device comprises a support frame adapted to be supported by a water craft and for extending into a body of water. A drive roller means is rotatably secured to the support frame for moving a metal wire-like conveyor over a plurality of conveyor rollers. A plurality of conveyor rollers is rotatably supported by the support frame; and a pick-up frame is secured to an end of the support frame. The pick-up frame has an upper pick-up roller and a lower pick-up roller both rotatably secured thereto. The apparatus or device further comprises a guide member means for slidably receiving a biased shaft which slidably passes through the guide member means. A roller support frame is secured to an end of the biased shaft; and a pair of guide rollers is rotatably secured to the roller support frame. An endless metal wire-like conveyor is entrained over the drive roller means, the conveyor rollers, the upper pick-up roller, the lower pick-up roller, and the pair of guide rollers.

The present invention further also accomplishes its desired objects by broadly providing a vessel that is capable of floating in water and for picking up oil from the water. The vessel has a deck that supports the apparatus or device which extends from the vessel into the water. The vessel comprises a liquid compartment means for holding a liquid that is capable of removing oil from the metal wire-like conveyor, and a first oil compartment means for receiving oil that has been removed from the metal wire-like conveyor by brushing with the brush means. The vessel also comprises a second oil compartment means for receiving oil that is removed from the wire-like conveyor by gravity falling and from over flowing the first oil compartment. The biased shaft extends into the liquid compartment to support the roller support frame and the guide rollers therein. The at least one brush means extends into the first oil compartment.

It is therefore an object of the present invention to provide an apparatus for picking up oil from water.

It is another object of the present invention to provide a vessel or water craft which supports the apparatus for picking up oil form water.

These, together with the various ancillary objects and features which will become apparent to those skilled in the art as the following description proceeds, are attained by this novel apparatus for picking oil in water, a preferred embodiment as shown with reference to the accompanying drawings, by way of example only, wherein;

BRIEF DESCRIPTION OF THE DRAWINGS

FIG. 2 is a top plan view of the apparatus in FIG. 1;

FIG. 3 is a side elevational view of the apparatus in FIG. 1;

FIG. 18 is side elevational view of yet another embodiment of the apparatus or device for picking up oil;

FIG. 19 is an enlarged side elevational view of part of the support frame, supporting the metal wire-like conveyor being moved by a drive roller;

FIG. 20 is a partial top plan view of part of the wire-like conveyor employed and conveyed for picking up oil from a body of water;

FIG. 22A is a segmented partial side elevational view of the spring biased inverted-T shaped support which extends down into the liquid compartment where residual oil is removed and further discloses a pair of roller chains having secured thereto the metal wire-like conveyor;

FIG. 22B is a front elevational view of a roller with the screen represented as dotted lines;

FIG. 22C is a front elevational view of a roller;

FIG. 22D is a front view of the screen;

FIG. 23A is a segmented view of the drive roller which may be driven by any suitable motor, such as an hydraulic motor;

FIG. 23B is a partial view of the sprocket of a roller;

FIG. 23C is an elevational view of a motor;

FIG. 23D is a front elevational view of a roller having its sprockets engaged to a screen;

FIG. 23E is an elevational view of a sprocket;

FIG. 23F is a partial elevational view of a roller and its associated sprocket.

DETAILED DESCRIPTION OF THE PREFERRED EMBODIMENT OF THE INVENTION

Figure 1:
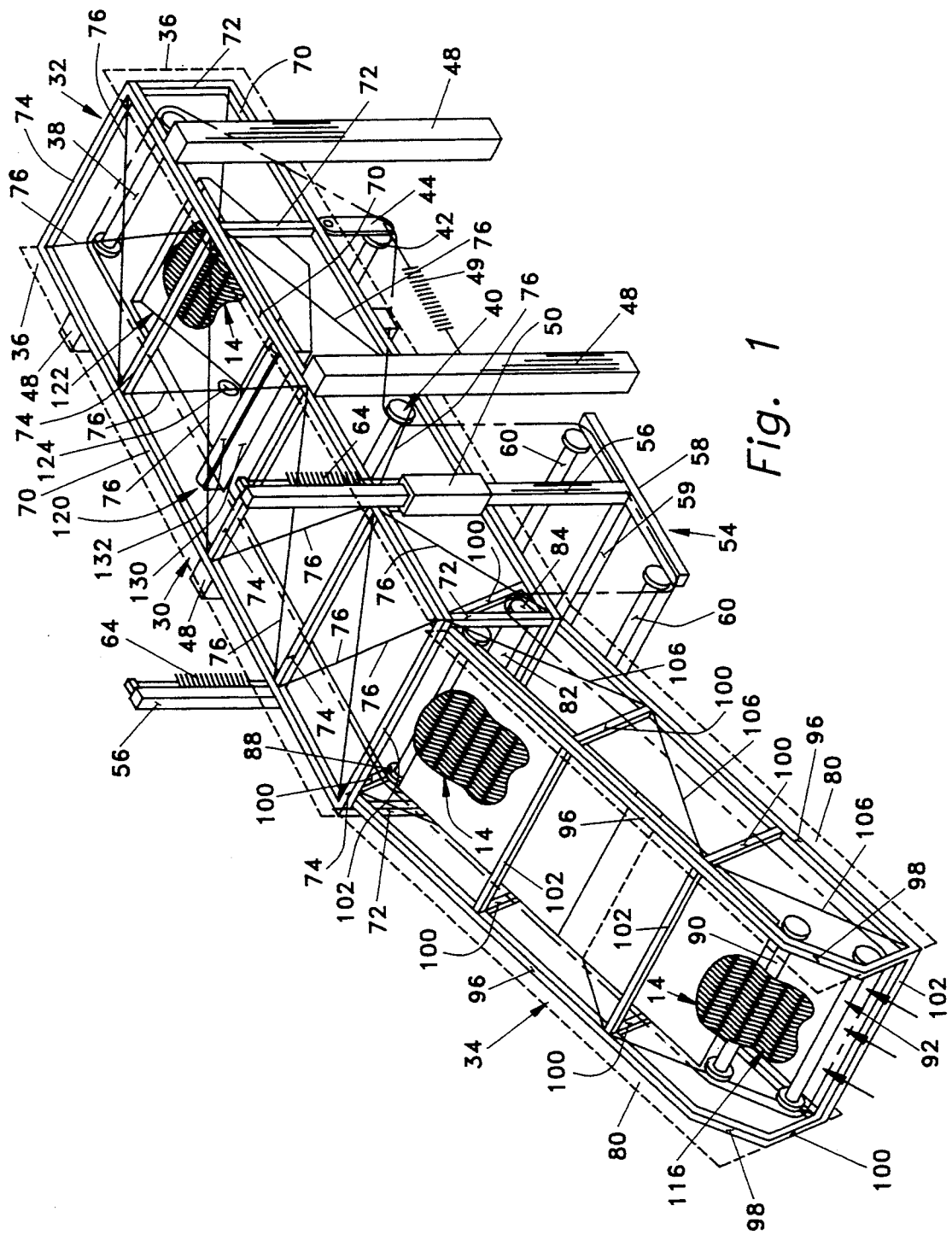
FIG. 1 is a perspective view of an embodiment of the apparatus or device for picking up oil from water.
Figure 4:
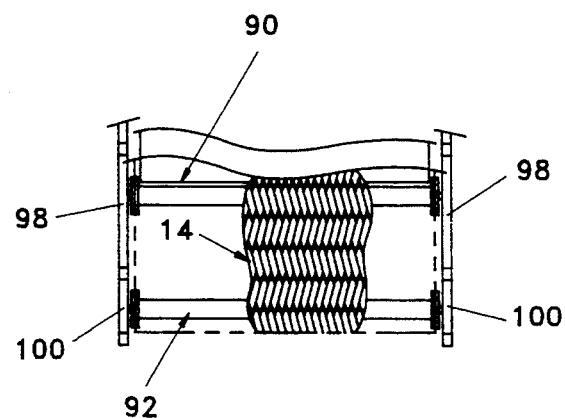
FIG. 4 is a front or end elevational view taken in direction of the arrows and along the plane of line 4—4 in FIG. 3.
Figure 5:
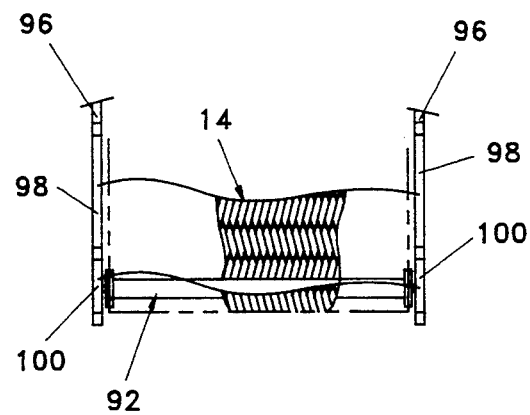
FIG. 5 is a vertical sectional view taken in direction of the arrows and along the plane of line 5—5 in FIG. 3.
Figure 6:
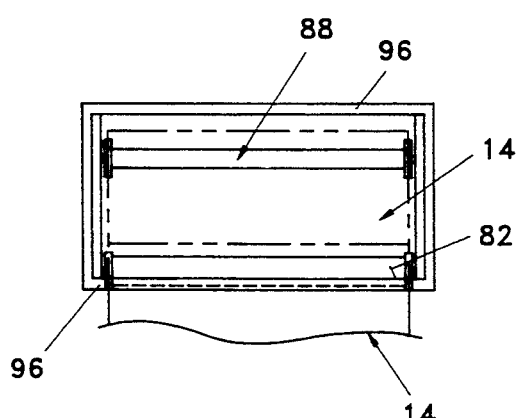
FIG. 6 is a vertical sectional view taken in direction of the arrows and along the plane of line 6—6 in FIG. 3.
Figure 7:
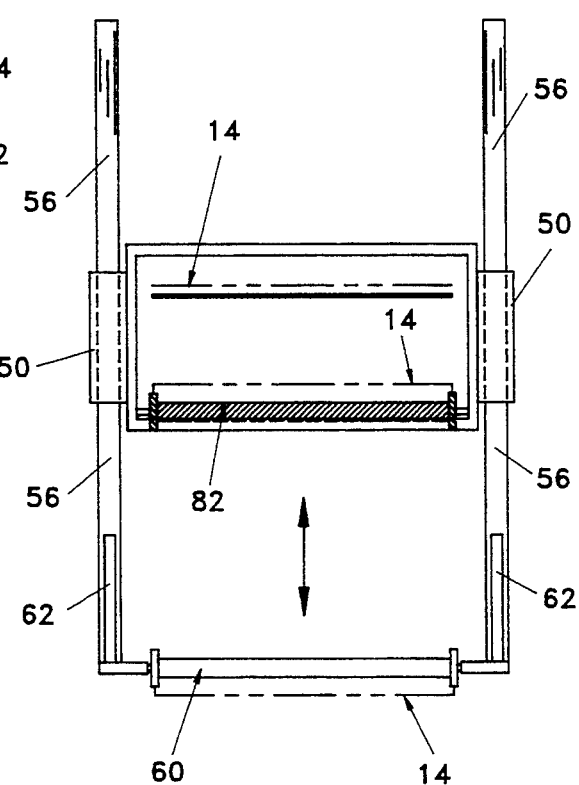
FIG. 7 is a vertical sectional view taken in direction of the arrows and along the plane of line 7—7 in FIG. 3.
Figures 8, 9:
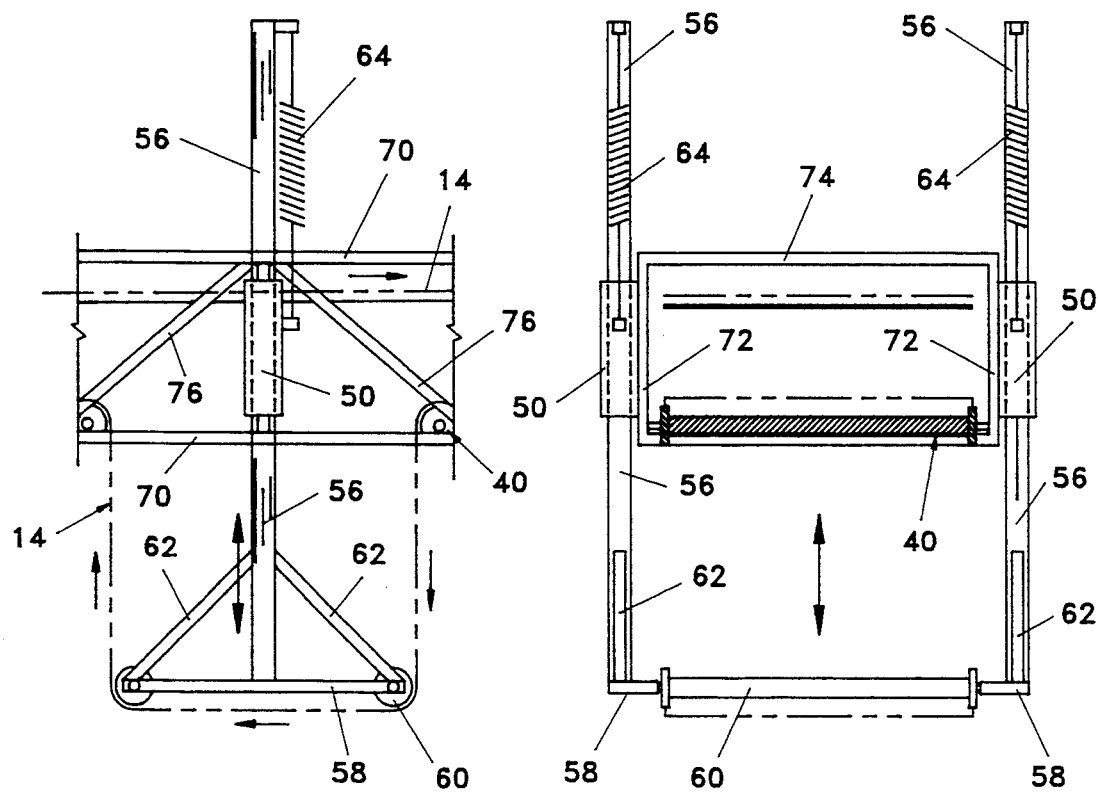
FIG. 8 is an elevational view taken in direction of the arrows and along the plane of line 8—8 in FIG. 2.
FIG. 9 is a vertical sectional view taken in direction of the arrows and along the plane of line 9—9 in FIG. 3.
Figure 10:
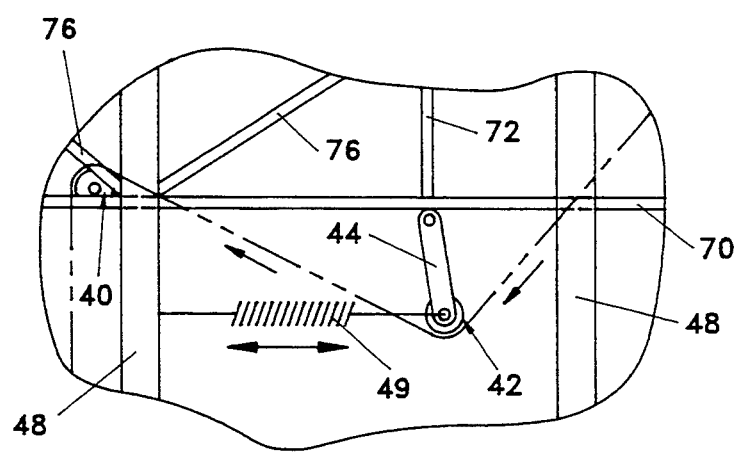
FIG. 10 is an elevational view taken in direction of the arrows and along the plane of line 10—10 in FIG. 2.
Figure 11:
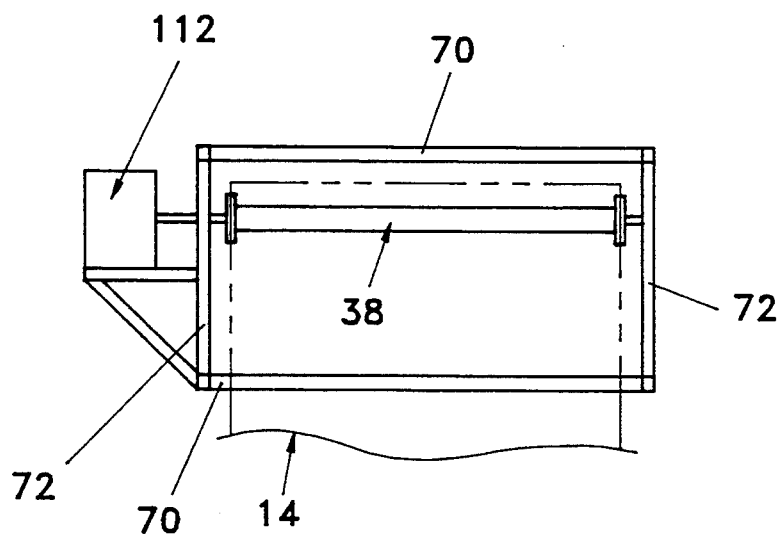
FIG. 11 is a vertical sectional view taken in direction of the arrows and along the plane of line 11—11 in FIG. 3.
Figure 12:
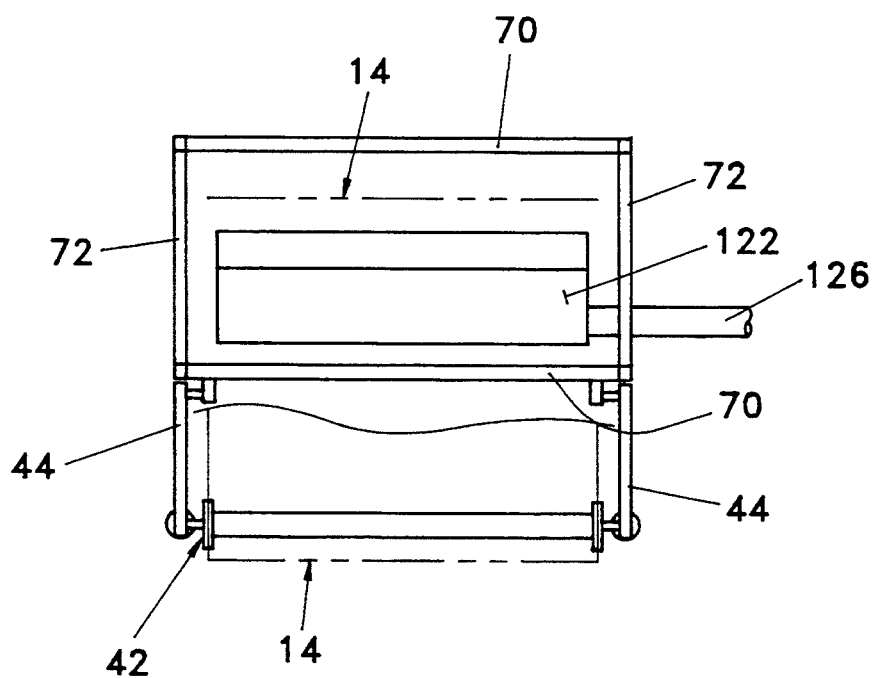
FIG. 12 is a vertical sectional view taken in direction of the arrows and along the plane of line 12—12 in FIG. 3.

Referring in detail now to the drawings, more specifically FIGS. 1-12, wherein similar parts of the invention are identified by like reference numerals, there is seen one embodiment of the apparatus, generally illustrated as 30, for picking up oil from water. The apparatus 30 comprises a main frame, generally illustrated as 32, and an ancillary frame, generally illustrated as 34, pivotally secured to the main frame 32. The ancillary frame 34 is capable of being pivoted up to the dotted line posture represented in FIG. 3.

The main frame 32 may be any suitable frame which is capable of functioning to accomplish the desired purpose of the main frame 32 and the desired purpose of the invention. By way of example only and as depicted in the drawings, the main frame 32 may comprise a pair of side members 36—36 (see dotted line representation in FIG. 1) rotatably supporting a drive roller, generally illustrated as 38, a main outside roller, generally illustrated as 40, and a main inside roller, generally illustrated as 42 and is rotatably secured to a pair of biased supports 44—44 which are pivotally secured to the side members 36—36. A plurality of legs 48—48—48—48 attach to the side members 36—36 for supporting the apparatus 30 in an elevated position. A pair of springs 49—49 interconnect the biased supports 44—44 to two of the legs 48—48. A pair of sleeves 50—50 (or hollow guides 50—50) may also connect to the side members 36—36. The sleeves 50—50 (or hollow guides 50—50) slidably engage and support a biased roller assembly, generally illustrated as 54. The biased roller assembly 54 comprises a pair of stanchions 56—56 slidably passing through the sleeves 50—50. A pair of roller supports 58—58 connect to the bottoms of the stanchions 56—56 for rotatably supporting a pair of inside assembly rollers 60—60. Brace members 62—62 (see FIGS. 3, 8 and 9) connect to roller supports 58—58 and the stanchions 56—56. Spring members 64—64 connect to the sleeves 50—50 and to the top of the stanchions 56—56 for biasing the stanchions 56—56 and the associated rollers supports 58—58, inside assembly rollers 60—60, and brace members 62—62 downwardly.

As previously mentioned, the main frame 32 may be any suitable frame or support which is capable of functioning to accomplish the desired purpose of the invention. More particularly, the main frame 32 may be any type of frame that is capable of rotatably supporting rollers 38, 40, and 42 and slidably supporting in a biased relationship the biased roller assembly 54. Obviously, the main frame 32 should be of the capability of supporting the plurality of legs 48. Thus, by further way of example only, the main frame 32 may comprise (or may additionally comprise in addition to the side members 36—36) horizontal members 70—70—70—70, a plurality vertical members 72 connecting to horizontal members 70, and a plurality of cross members 74 also connecting to the horizontal members 70. The main frame 32 may additionally comprise criss-cross members 76; some of which connect horizontal members 70 and vertical members 72, others of which also connect to horizontal members 70 but to cross members 74. Obviously, if side members 36—36 are employed they would be supported by the horizontal members 74 and/or the vertical members 72.

The ancillary frame 34 may be any suitable frame which is capable of functioning to accomplish the desired purpose of the ancillary frame 34 and the desired purpose of the invention. By way of example only and as illustrated in the drawings, the ancillary frame 34 may comprise a pair of side members 80—80 (see dotted line representation in FIG. 1) rotatably supporting an ancillary outside roller, generally illustrated as 82 and having flanged ends 84—84 which also extend through and lodge on the outside of side members 36—36 for pivotally securing the ancillary frame 34 to the main frame 32. The side members 80—80 of the ancillary frame may also support ancillary inside rollers 88, 90 and 92. As previously indicated, the ancillary frame 34 is capable of being pivoted (more specifically pivoted about outside roller 82 and its associated flanged ends 84—84) on the main frame 32 to a generally horizontal position as indicated in the dotted line representation in FIG. 3. As further previously indicated, the ancillary frame 34 may be any suitable frame or support which is capable of functioning to accomplish the desired purpose of the invention. More specifically, the ancillary frame 34 may be any type of frame that is capable of rotatably supporting rollers 82, 88, 90 and 92. Thus, by further way of example only, the ancillary frame 34 may comprise (or may additionally comprise in addition to the side members 80—80) horizontal members 96—9-6—96—96; a pair of slanted members 98—98 integrally bound to the top two horizontal members 96—96; and plurality of vertical members 100, two of which connect to the pair of slanted members 98—98 and the remaining of which interconnect upper (or top) and lower (or bottom) horizontal members 96—96. The ancillary frame 34 may also comprise a plurality of cross members 102 also connecting to the horizontal members 96—96, and a plurality of obliquely disposed and/or criss-cross members 106 some of which connect horizontal members 96 and cross members 106 (see FIG. 2) and others of which connect to horizontal members 96 and to vertical members 100 (see FIG. 3). Obviously, if side members 80—80 are also employed, they would be supported by the horizontal members 96 and/or the vertical members 100.

A metal wire-like conveyor, generally illustrated as 14, is entrained to or over all of the rollers, more specifically rollers 38, 42, 60—60, 82, 88, 90 and 100. The metal wire-like conveyor 14 may be any suitable wire-like conveyor 14 that is capable of picking up oil from water. Suitable wire-like conveyors 14 have been determined to be any of the suitable wire-like belts, nets, conveyors or spiral, weaved belts with mesh openings (e.g. 1/64 in. to 2½ in.) and wire gauges ranging from 4 to 24 gauge, manufactured and sold by Alloy Wire Belt Company, 2318 Tenaya Drive, Modesto, Calif. 95354. The metal wire-like conveyor 14 (with mesh openings) is to be manufactured of ferrous or nonferrous alloys and nickel-chrome alloys. The conveyor 14 is supported by a pair of drive chains 110 which, as will be further explained below, is entrained to and driven by sprockets of the drive roller 38 that is rotatably driven by a motor 112 which is coupled to the drive roller 38 (see FIG. 2). Motor 112 (which may be any suitable electrical or mechanical motion with sufficient features to accomplish its desired purpose) rotatably drives the drive roller 38 which moves the conveyor 14 over and/or partially around the rotatable rollers (i.e. rollers 42, 60—60, 82, 90 and 100) in order that an exposed front section, generally illustrated as 116, of the conveyor 14 between the ancillary rollers 90 and 92 comes in contact with oil in water such that the metal conveyor 14, which has an affinity for oil, may remove the oil from the water. One of the salient features of the present invention is that the exposed front section 116 is angularly disposed at an angle "a" with respect to a horizontal plane (see FIG. 3). The angle "a" may be any suitable angle that enables the exposed front section 116 to come in contact with the oil in the water to expeditiously remove the same. Preferably the angle "a" ranges from about 5 degrees to about 45 degrees, more preferably from about 10 degrees to about 35 degrees, and most preferably from about 15 degrees to about 25 to 30 degrees. An angle "a" having a value of about 20 degrees has been found to be acceptable.

After the oil adheres to the metal, perforated conveyor 14 in the exposed front section 116, the latter is moved up the ancillary frame 34. Obviously another section of the conveyor 14 is moved between the rollers 90 and 92 to become an exposed front section 116 which will cause the conveyor 14 (more specifically this new exposed front section 116) to gather additional oil for movement up the ancillary frame 34. The conveyor 14 (more specifically the serial exposed front sections 116) moves the oil up the ancillary frame 34 and over the roller 88 and onto the main frame 30. The gathered oil moves in the conveyor 14 (more specifically in the exposed front section 116) in direction of the arrows in FIGS. 2 and 3 until it contacts a means, generally illustrated as 120, for removing oil from the conveyor 14 such that the oil may fall by gravity into a tank 122. Tank 122 is attached to and supported by the main frame 32 and has an aperture 124 that communicates with a conduit 126 (see FIG. 2) which receives and conducts oil from the tank 122. The means 120 for removing oil may be any suitable means which can cause oil to fall from teh conveyor 14 and into the tank 122. By way of example only, the means 120 for removing oil may be a paddle 130 or a cylindrical brush 132 that frictionally touches and engages the top of the conveyor 14. The means 120 may be a combination of a paddle 130 and a brush 132 all of which loosens and disengages the oil from the conveyor 14 (see FIGS. 1, 2 and 3). The means 120 (i.e. paddle 130 and/or brush 132) is engaged to or connected to the main frame 32 (e.g. to horizontal members 70—70 or to side members 36—36) to be supported in a position that is transverse to moving conveyor 14 (see FIGS. 1-3). The spring biased roller assembly 54 (along with the roller 42 that is rotatably secured to the spring loaded and biased supports 44—44) keeps the conveyor 14 taunt during operation and when the ancillary frame 34 is pivoted to the dotted line horizontal position in FIG. 3. The dotted line horizontal position in FIG. 3 shortens the length of the conveyor 14 employed in the ancillary frame 34, while the length of the conveyor 14 in the main frame 32 is lengthened or increased due to the decrease of the length in the ancillary frame 34. When the ancillary frame 34 is in the dotted line horizontal position in FIG. 3, the springs 64—64 drive stanchions 56—56 downwardly to move the rollers 60—60 away from the bottom of the main frame 32 to take up the extra length of conveyor in the main frame 32. One of the features of the present invention is that all inside rollers (i.e. rollers having their outside surfaces movably covered by the conveyor 14 such as not to be entirely seen from the outside of the main frame 32 and the ancillary frame 34) have a pair of shoulders 136—136 for supporting the pair of roller chains 110—110 which secure to the conveyor 14 (see FIG. 22). More specifically and as best shown in FIG. 22, each of the inside rollers (e.g. rollers 38, 42, 60—60 88, 90 and 92) would typically have a main cylinder 138 for rotating and having the conveyor 14 through contact with the latter, and the pair of shoulders 136—136 generally coaxially bound to the main cylinder 138 and having a smaller diameter than the diameter of the main cylinder 138 such that a pair of channels or recesses 140 is respectively formed between the two to provide a space for movably accepting and movably housing the pair of roller chains 110—110. The inside rollers also have an axle 142 coaxially extending through the main cylinder 138 and shoulders 136—136 or coaxially secured to the shoulders 136—136 in an opposed relationship. Whenever "inside" is mentioned herein to describe or designate a roller, such described or designated roller will have the features as immediately described and as depicted in FIG. 22. All outside rollers (i.e. rollers having their inner surfaces movably covered by the conveyor 14 such that the outer surfaces can be seen from outside of the main frame 32 and the ancillary frame 34) do not have any shoulders 136—136 to provide recesses 140—140 for movably receiving the chains 110—110. More specifically and as best shown in FIG. 22 each of the outside rollers (e.g. rollers 40 and 82) consist of the main cylinder 138 and an axle 142 coaxially extending through the main cylinder 138 or coaxially secured to the main cylinder 138. Recesses 140—140 are not needed for outside rollers because when the conveyor 14 passes over each outside roller, it passes in the dotted line posture depicted in FIG. 22 with the pair of chains 110—110 protruding upwardly. Whenever "outside" is mentioned herein to describe or designate a roller, such described or designated roller will have the features as immediately described and as depicted in FIG. 22.

The drive roller 38 (see FIG. 23) is formed with a main drive cylindrical body 148 having a drive axle 149 engaged thereto. The drive axle 149 is coupled to the motor 112. A bearing 150 is supported by the axle 149 along with a pair of sprockets 152—152 which respectively engage the pair of chains 110—110 for moving the conveyor 14 when the sprockets 152—152 are caused to be rotated by the motor 112 (see FIG. 23). As the motor 112 rotatably drives the sprockets 152—152 to move the chains 110—110 and cause conveyor 14 to move around the cylindrical body 148 of the drive roller 38, such rotary empowered motion causes movement to be transversed throughout the endless conveyor 14 to cause the same to move over all rollers (i.e. both inside and outside rollers) for a continuous process of picking up oil from water in any available exposed front section 114 and moving the gathered oil up the ancillary frame 34 and onto the main frame 32 to eventually contact the means 120 for removing oil, which contacts and removes oil from the conveyor 14. After the oil is removed from the any available exposed front section 114, the conveyor 14 is continually moving to move the oil-removed exposed front section 114 around to repeat the process again.

Figure 13:
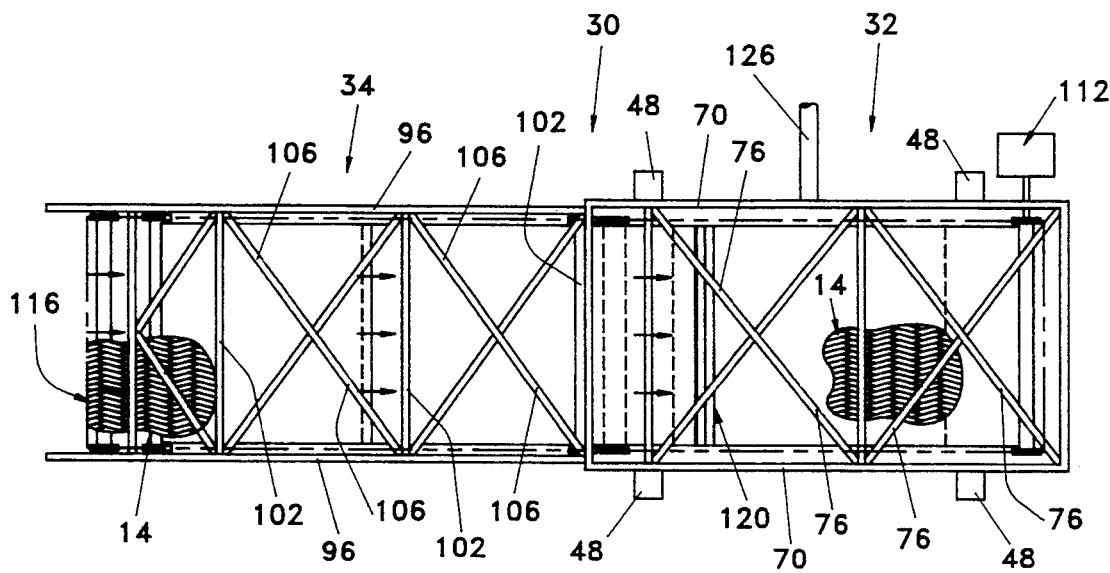
FIG. 13 is a top plan view of another embodiment of the apparatus or device for picking up oil from water.
Figure 14:
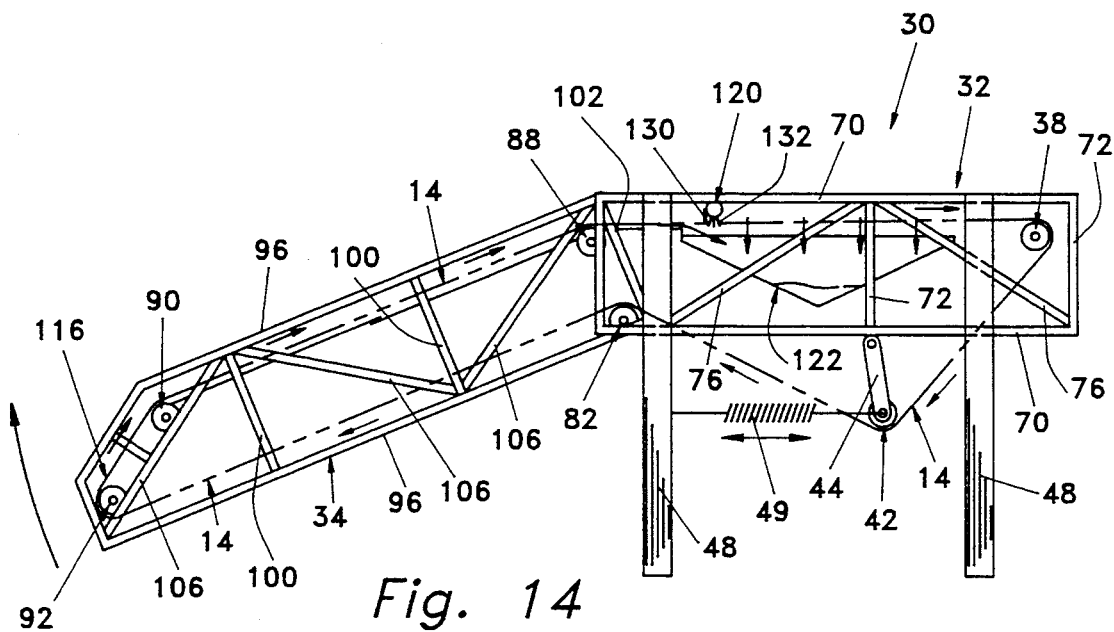
FIG. 14 is a side elevational view of the apparatus in FIG. 13.

There are a number of preferred embodiments of the present invention. In the embodiment depicted in FIGS. 13–14, the roller assembly 54 is not employed. Roller 40 has also been removed while other features of the present invention remain.

Figure 15:
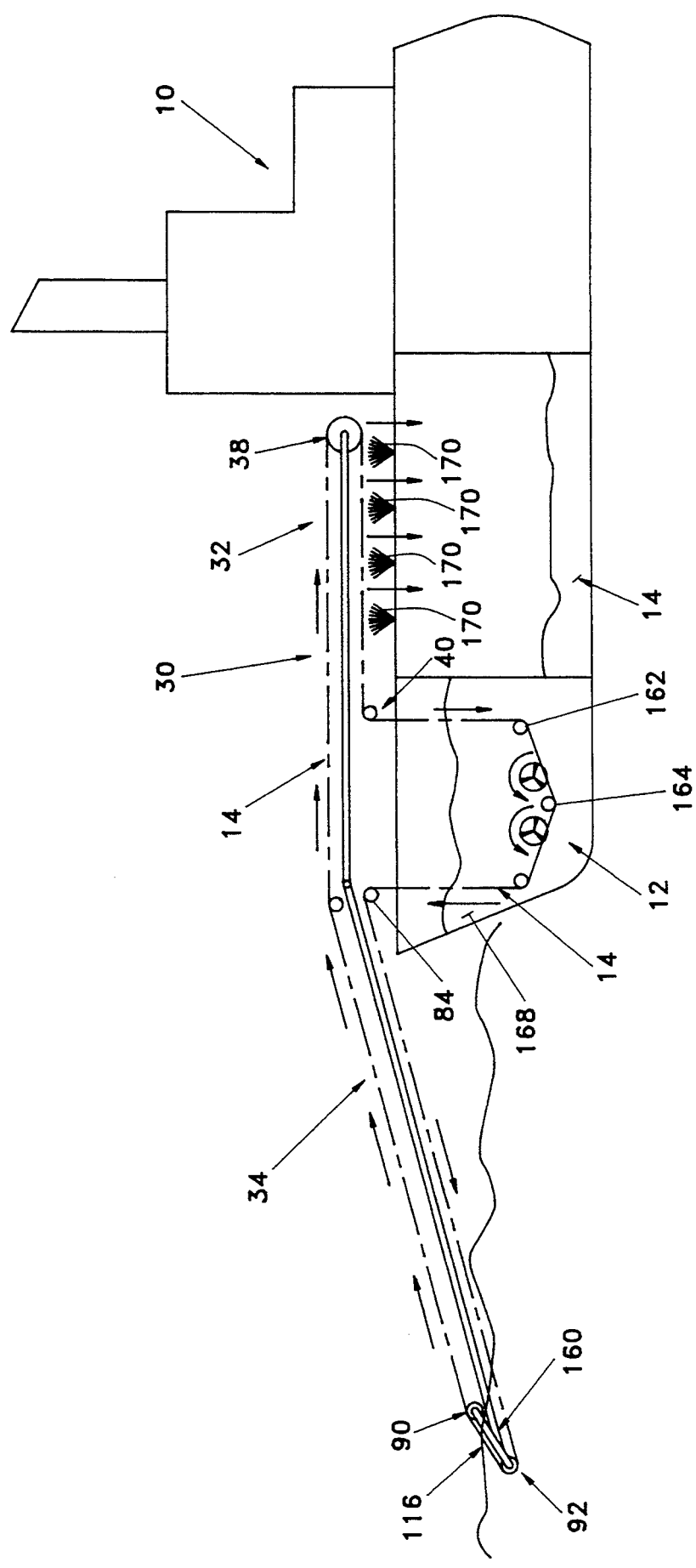
FIG. 15 is a side elevational view of one embodiment of a vessel having the apparatus or device supported thereby for picking up oil from water.
Figure 16:
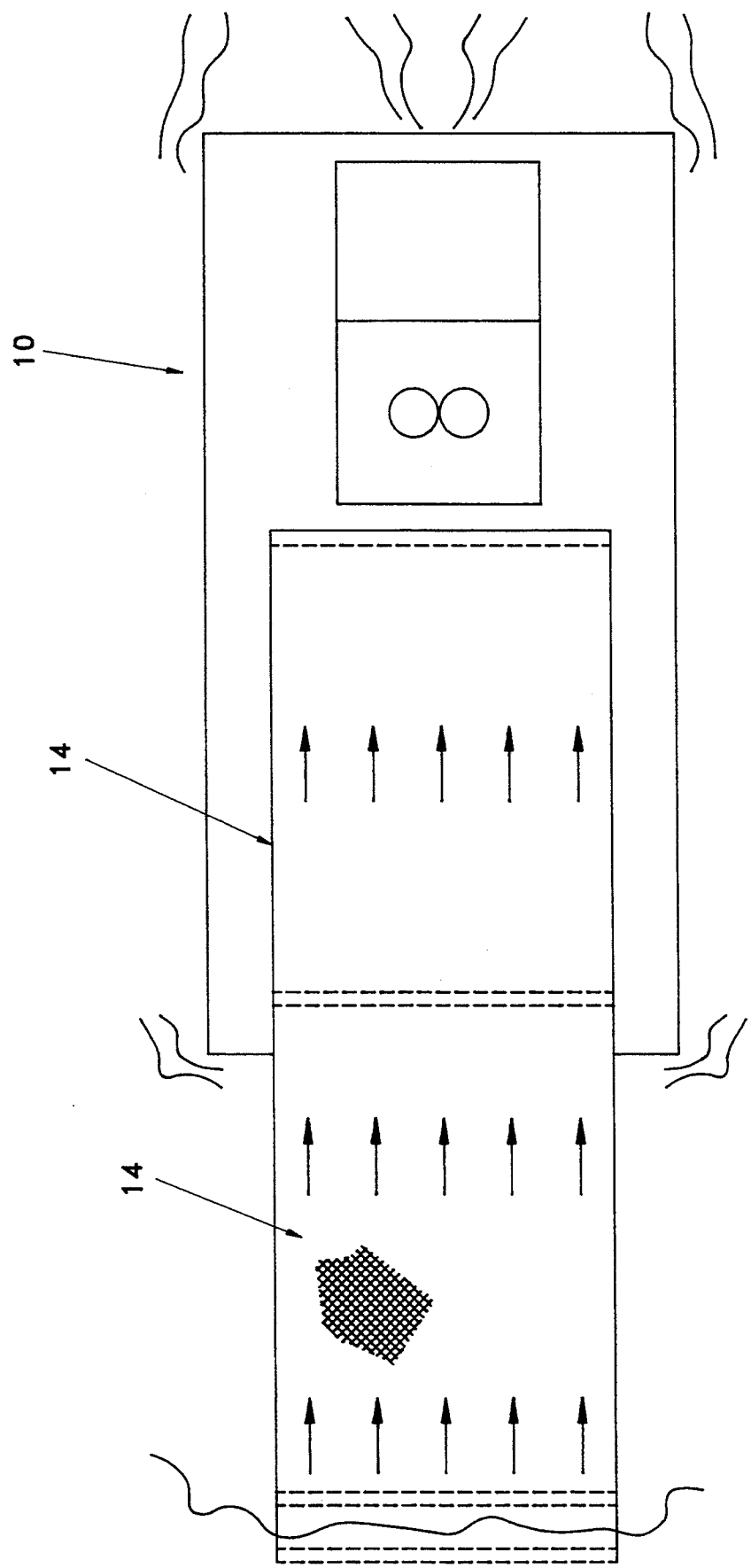
FIG. 16 is a top plan view of the vessel of FIG. 1.
Figure 17:
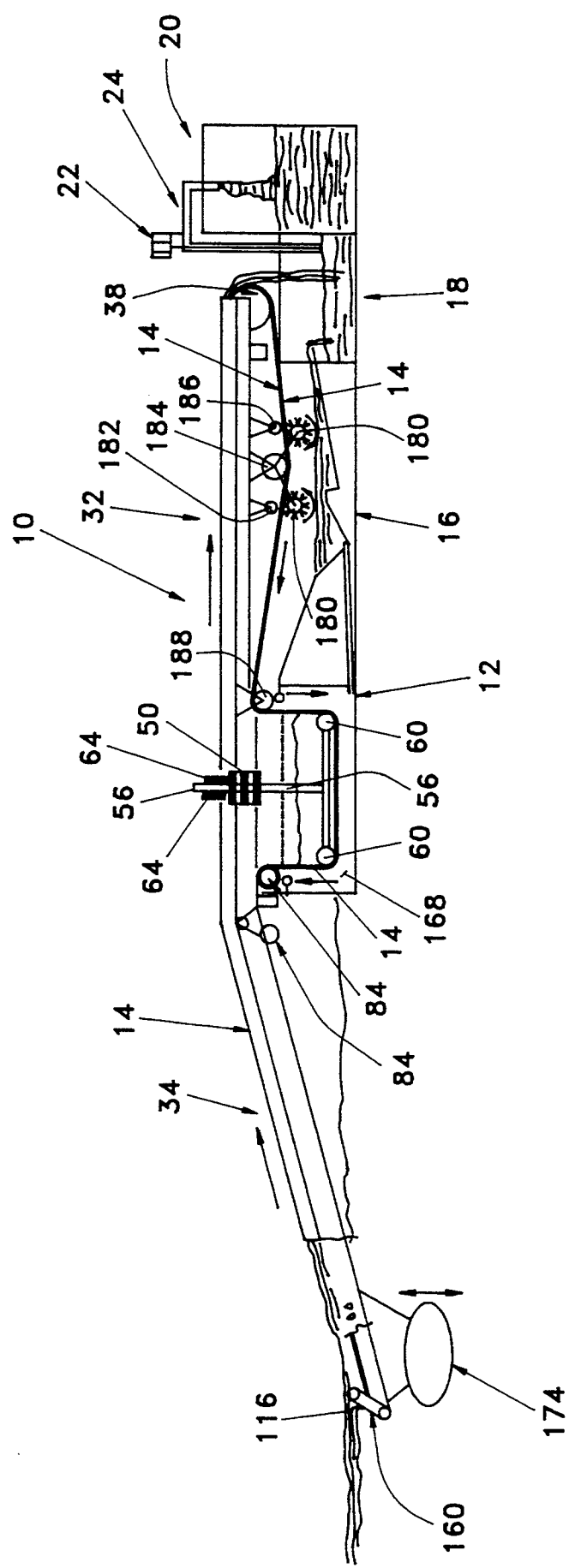
FIG. 17 is a side elevational view of another embodiment of the apparatus or device for picking up oil.

In FIGS. 15 and 16 there is seen a vessel, generally illustrated as 10, having a liquid compartment, generally illustrated as 12, for containing a liquid (i.e. hot water or the like) that is capable of removing residual oil from metal, such as the metal wire-like conveyor, generally illustrated as 14. As best shown in FIG. 17 the vessel 10 may also include an oil compartment 16 where oil is accumulated after being brushed off the metal wire-like conveyor 14. The liquid compartment 12 is contiguous to the oil compartment 16. Contiguous to oil compartment 16 in the vessel 10 is another oil compartment 18 where oil accumulates after falling by gravity from the metal wire-like conveyor 14 as it moves over and around the drive roller, generally illustrated as 38. Oil in compartment 18 also accumulates by over-flowing from compartment 16 (see FIG. 3). A pump 22 may be provided with a conduit 24 for pumping oil from compartment 18 to yet another compartment 20 in the vessel 10 where oil is stored. As shown in FIG. 17 compartment 20 is contiguous or juxtaposed to compartment 18.

Further referencing FIGS. 15 and 16, there is seen a pick-up frame, generally illustrated as 160, secured to the end of the frame (i.e. the ancillary frame 34). The pick-up frame 160 includes rollers 90 and 92. Inside rollers 162, 164, and 166 are rotatably disposed in compartment 12, more specifically rotatably supported and mounted to the side of the compartment 12 to move the conveyor 14. The compartment 12 contains hot water 168 for removing residual oil from the conveyor 14 which was not removed by brushes 170 that are in contact with the moving conveyor 14 to disenlodge oil to cause same to fall by gravity into compartment 14. In the embodiment (see FIG. 22) of the invention employing the roller assembly 54, a hot water compartment 172 may be employed to remove residual oil. A buoyant member 174 may be supported by the ancillary frame 34 or the pick-up frame 160 to help or assist in flotation of the frames and the conveyor 14.

Figure 21:
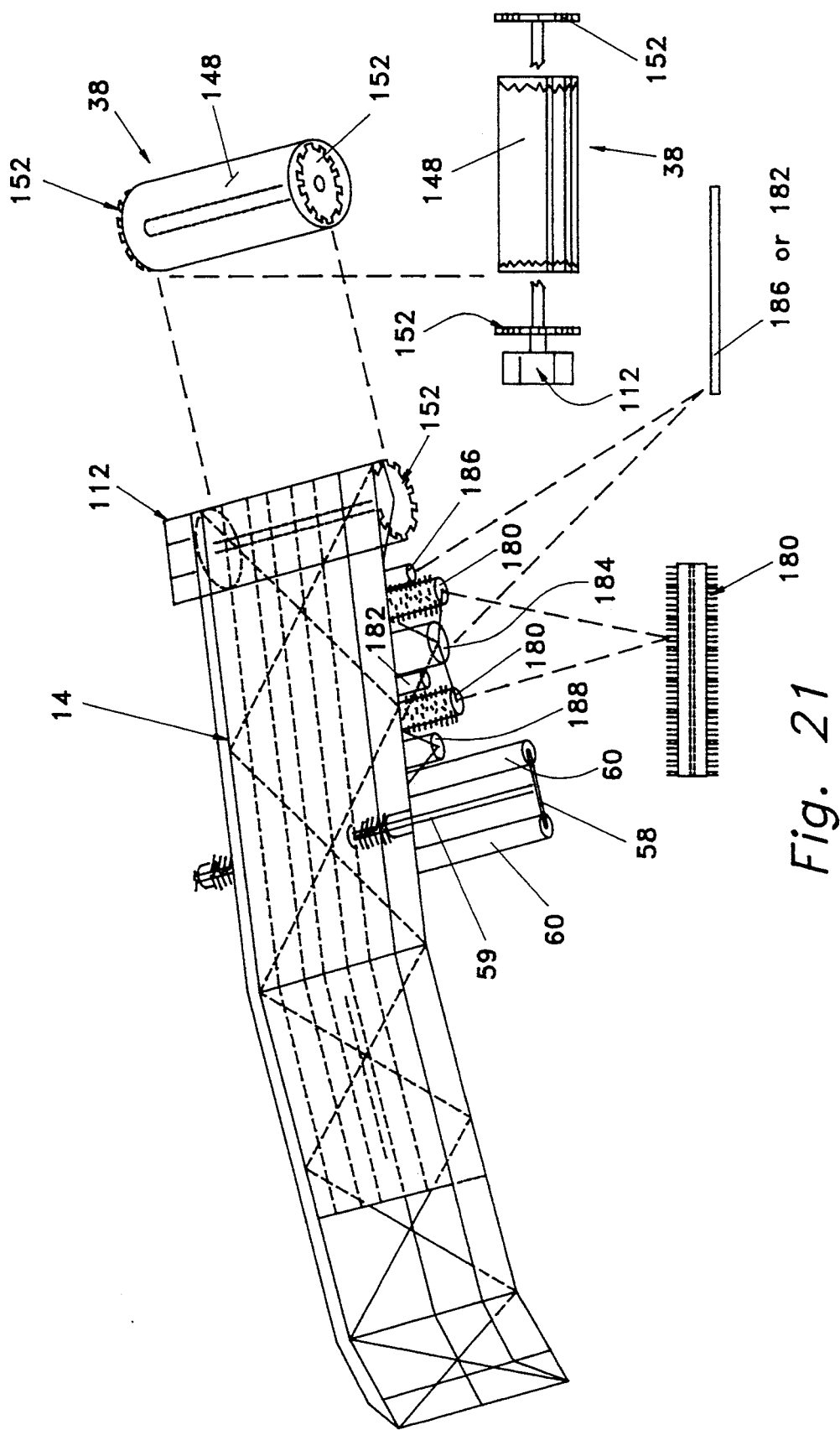
FIG. 21 is a disassembled partial perspective view of the wire-like conveyor, the drive roller, the brushes for brushing oil off the underside of the wire-like conveyor, and the pair of rollers which are rotatably supported by the spring loaded frame that extends down into the liquid (i.e. hot water) compartment where residual oil on the wire-like conveyor is removed.
Figure 24A:
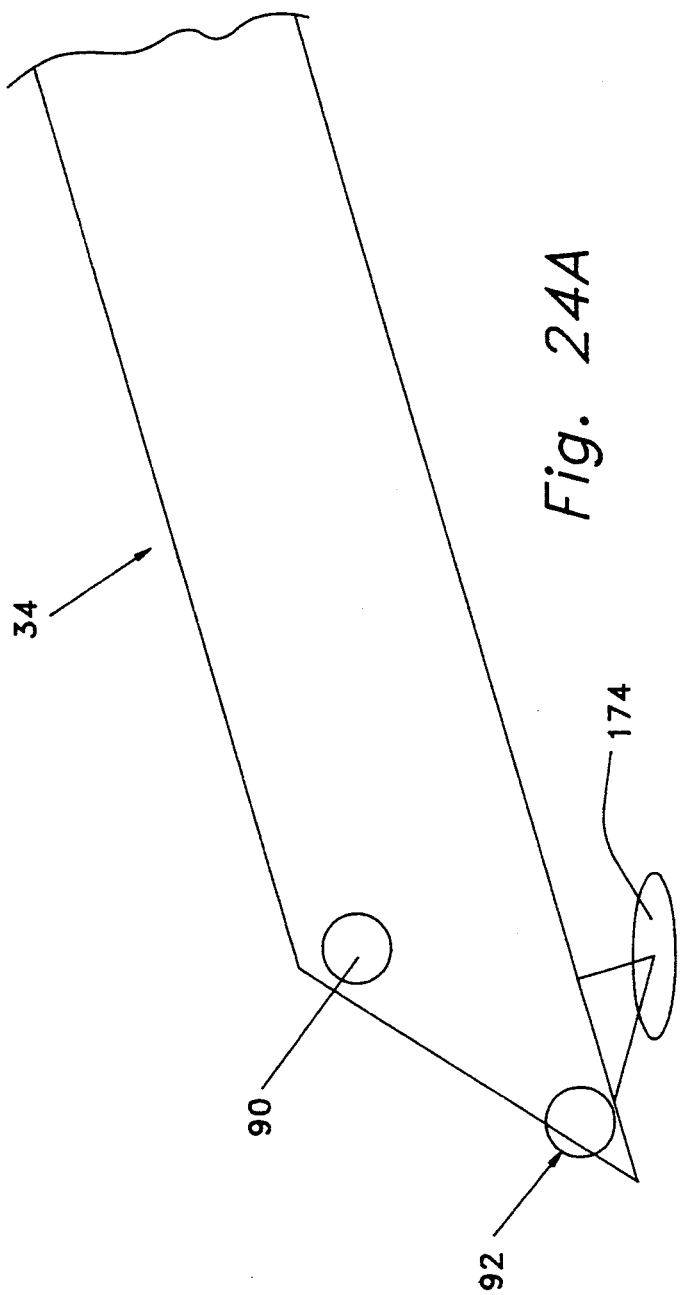
FIG. 24A is a partial view of the front of the frame support having a buoy secured thereto to assist in the buoyant of the frame support.
Figure 24B:
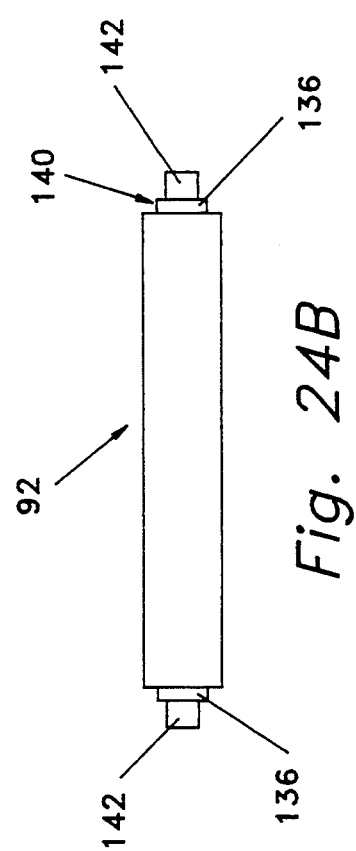
FIG. 24B is an elevational view of the roller for the front of the frame support of FIG. 24A.
Figure 25:
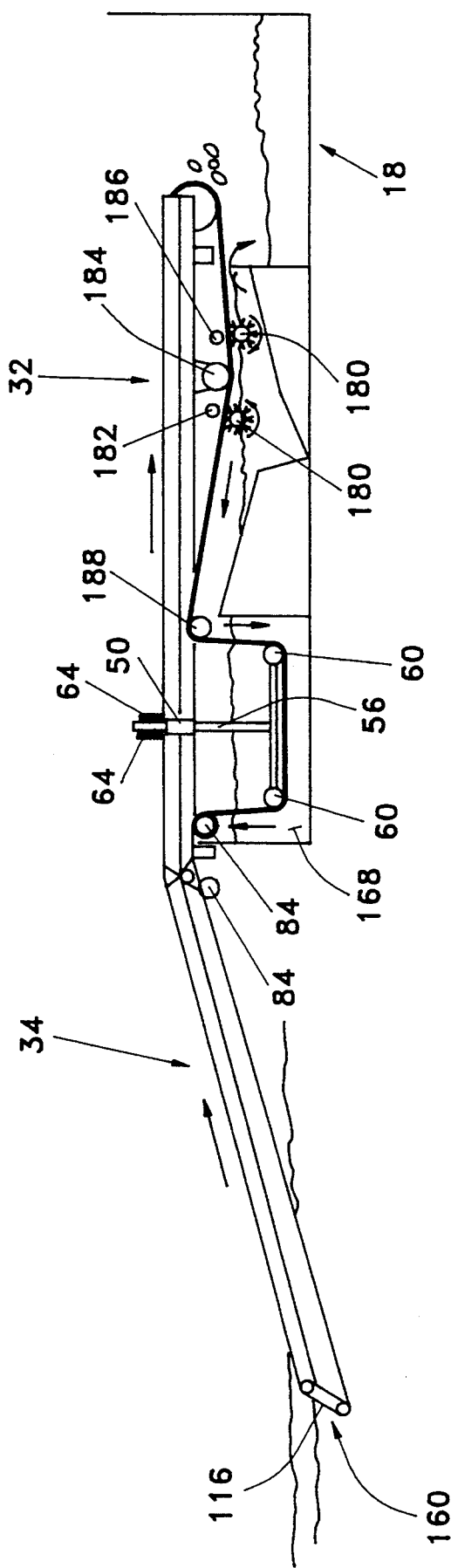
FIG. 25 is another side elevational view of the other embodiment of the FIG. 18 apparatus or device for picking up oil.
Figure 26:
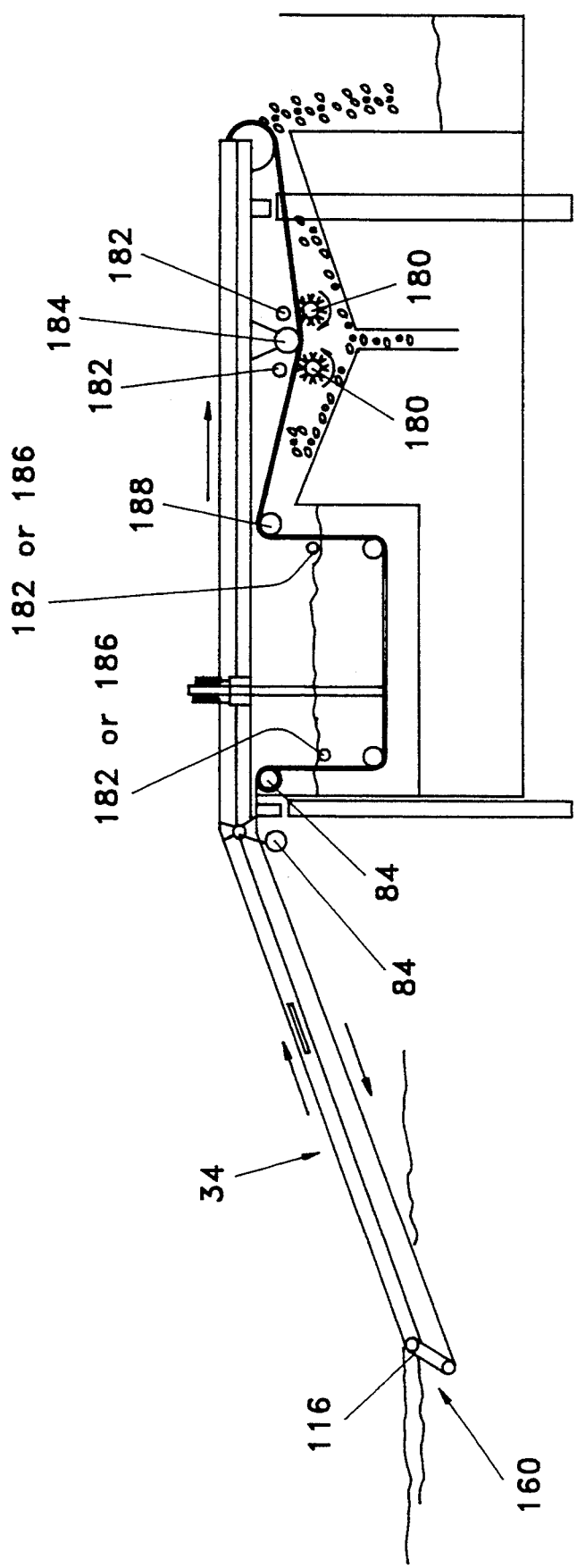
FIG. 26 is a further side elevational view of the other embodiment of the FIG. 18 apparatus or device for picking up oil.
Figure 27:
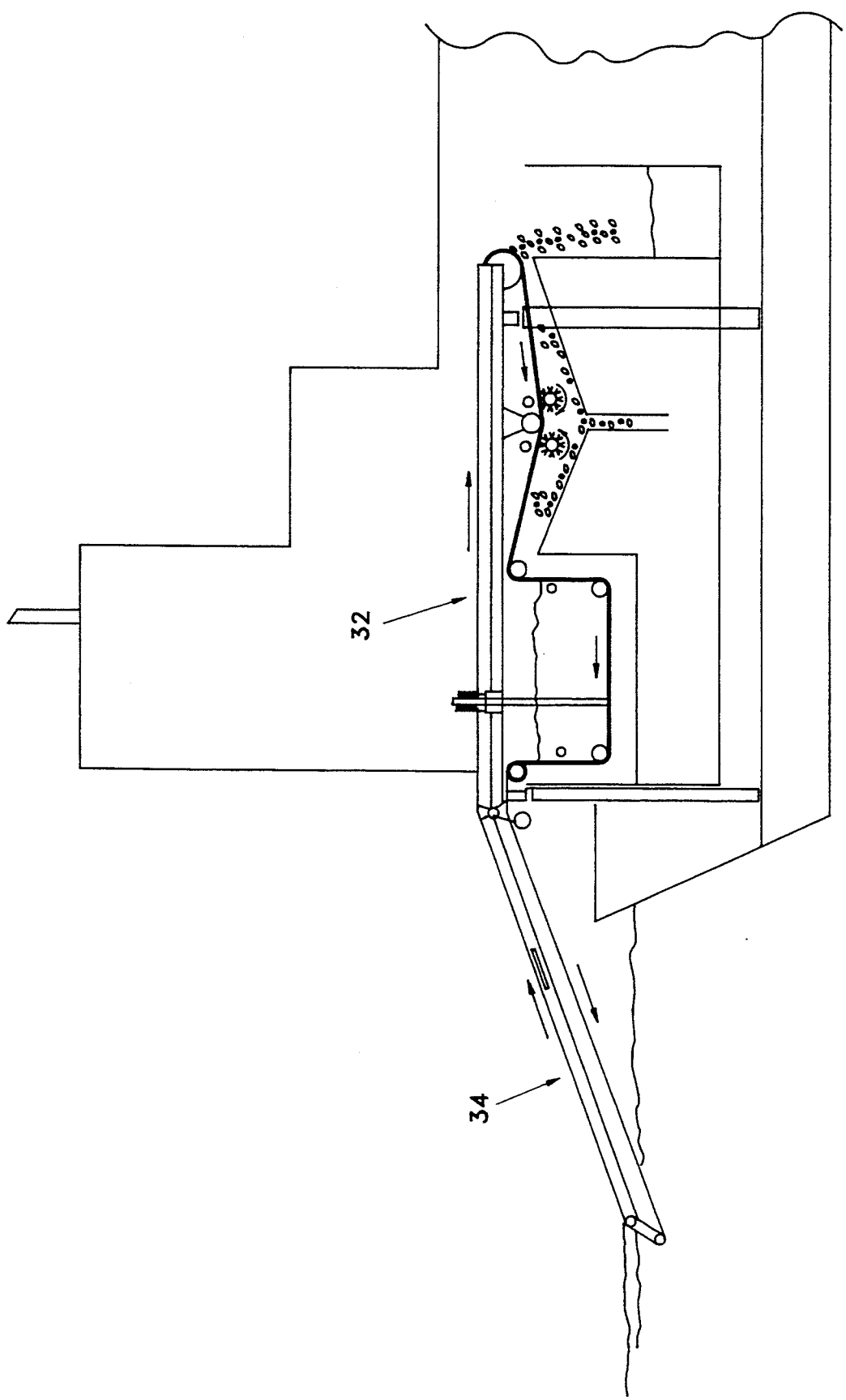
FIG. 27 is still another side elevational view of the FIG. 26 apparatus or device mounted on a vessel.

Referring further now to FIGS. 17, 18 and 21, brushes 180 and 180 are supported by main frame 32 for disengaging oil from the conveyor 14 that does not fall from the conveyor 14 after passing over the drive roller 38. Inside rollers 182, 184 and 186 are supported by the main frame 32 in a depending relationship along with outside roller 188. The operation of the embodiments of the invention depicted in FIGS. 13–24 readily discernible from the described operation for the embodiment in FIGS. 1–12.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An apparatus for picking up oil from water and adapted to be installed on a water craft comprising
   a support frame adapted to be supported by a water craft;
   a drive roller means rotatably secured to the support frame for moving a metal wire-like conveyor over a plurality of conveyor rollers;
   a plurality of conveyor rollers rotatably supported by the support frame;
   a pick-up frame pivotally secured to an end of the support frame, said pick-up frame being adapted to extend into a body of water and having an upper pick-up roller and a lower pick-up roller both rotatably secured thereto;
   a guide member means for slidably receiving a biased shaft;
   a biased shaft slidably passing through the guide member means;
   a roller support frame secured to an end of the biased shaft;
   a pair of guide rollers rotatably secured to the roller support frame; and
   an endless metal wire-like conveyor entrained over the drive roller means, the conveyor rollers, the upper pick-up roller, the lower pick-up roller, and the pair of guide rollers.

2. The apparatus of claim 1 additionally comprising at least one rotatable brush means supported by one of said plurality of conveyor rollers for rotatably engaging the endless metal wire-like conveyor.

3. The apparatus of claim 2 additionally comprising a buoyant member secured to the end of the support frame for buoyancy.

4. The apparatus of claim 3 additionally comprising a drive means coupled to the drive roller means for rotating the drive roller means.

5. The apparatus of claim 4 wherein said biased shaft is biased by at least one spring means connected to the biased shaft and to the guide member means for normally biasing the biased shaft downwardly.

6. A vessel that is capable of floating in water and for picking up oil from the water comprising;
   (a) a liquid compartment means for holding a liquid that is capable or removing oil form a metal wire-like conveyor;
   (b) a first oil compartment means for receiving oil that has been removed from a metal-like conveyor by brushing;
   (c) a second oil compartment means for receiving oil that is removed from a metal wire-like conveyor by gravity falling and from over flowing the first oil compartment;
   (d) a support frame disposed and supported by the vessel and for extending into a body of water; a support frame supported by a water craft;
   a drive roller means rotatably secured to the support frame for moving a metal wire-like conveyor over a plurality of conveyor rollers;
   a plurality of conveyor rollers rotatably supported by the support frame;
   a pick-up frame pivotally secured to an end of the support frame, said pick-up frame being adapted to extend into a body of water and having an upper pick-up roller and a lower pick-up roller both rotatably secured thereto;
   a guide member means for slidably receiving a biased shaft and supported by the vessel;
   a biased shaft slidably passing through the guide member means;
   a roller support frame secured to an end of the biased shaft;
   a pair of guide rollers rotatably secured to the roller support frame; and
   an endless metal wire-like conveyor entrained over the drive roller means, the conveyor rollers, the upper pick-up roller, the lower pick-up roller, and the pair of guide rollers.

7. The vessel of claim 6 additionally comprising at least one rotatable brush means supported by one of said plurality of conveyor rollers for rotatably engaging the endless metal wire-like conveyor.

8. The vessel of claim 7 additionally comprising a buoyant member secured to the end of the support frame for buoyancy.

9. The vessel of claim 8 additionally comprising a drive means coupled to the drive roller means for rotating the drive roller means.

10. The vessel of claim 9 wherein said biased shaft is biased by at least one spring means connected to the biased shaft and to the guide member means for normally biasing the biased shaft downwardly.

11. The vessel of claim 10 wherein said biased shaft extends into said liquid compartment to support said roller support frame and said guide rollers therein.

12. The vessel of claim 11 wherein said at least one rotatable brush means extends into the first oil compartment.

13. The vessel of claim 12 additionally comprising a third oil compartment, and a pump means for pumping oil from the second oil compartment to the third oil compartment.

14. An apparatus for picking up oil from water comprising a main frame adapted to be installed on a water craft; an ancillary frame pivotally secured to the main frame; a drive roller rotatably supported by the main frame; a means, engaged to the drive roller, for driving and rotating the drive roller; a spring biased main inside roller supported by the main frame; a main outside roller rotatably supported by the main frame; a biased roller assembly supported by the main frame and having a pair of assembly inside rollers; an ancillary outside roller rotatably supported by the ancillary frame; a plurality of ancillary inside rollers rotatably supported by the ancillary frame; and an endless metal wire-like conveyor entrained over the drive roller, the biased main inside roller, the main outside roller, the pair of assembly inside rollers, the ancillary outside rollers and the plurality of ancillary inside rollers.

* * * * *